Nov. 8, 1932.  C. E. WISE  1,887,344

LOCKING VALVE FOR GAS BURNERS

Filed Jan. 30, 1930

INVENTOR
Charles E. Wise
By W. W. Williamson
Atty.

Patented Nov. 8, 1932

1,887,344

UNITED STATES PATENT OFFICE

CHARLES E. WISE, OF PHILADELPHIA, PENNSYLVANIA

LOCKING VALVE FOR GAS BURNERS

Application filed January 30, 1930. Serial No. 424,504.

My invention relates to new and useful improvements in a locking valve for gas burners, and has for one of its objects to improve the construction of the valve illustrated and described in my co-pending patent application, Serial No. 318,696, filed November 12, 1928.

Another object of the invention is to generally improve the construction of devices of this kind in order that certain parts will be protected against the accumulation of dirt, dust or other foreign matter which tends to hinder the proper operation of the valve.

A further object of the invention is to so arrange the parts as to provide a compact, neat appearing valve free of the usual cavities or crevices which act as dirt catchers.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Figure 1:
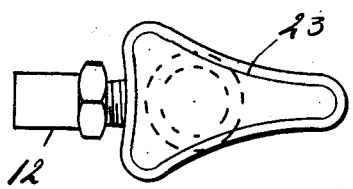
Fig. 1 is a plan view of a locking valve for gas burners, constructed in accordance with my improvement showing the handle in the full open position.
Figure 2:
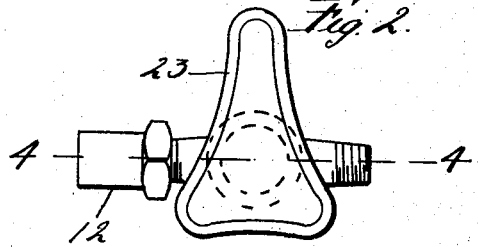
Fig. 2 is a similar view showing the handle in a closed position.
Figure 3:
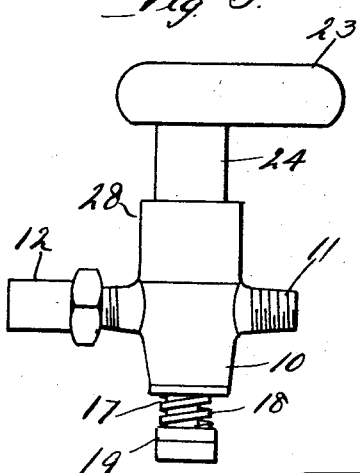
Fig. 3 is a side elevation of Fig. 1.

In carrying out my invention as herein embodied, 10 represents the body of the valve such as is usually used in connection with gas stoves and other gas burning appliances and is provided with an inlet 11 for connection with a pipe or manifold and an outlet 12 for the co-operation with the usual burner. Extending through the valve body from the inlet to the outlet is a gas passageway 13 and crosswise of this is a hole 14 for the reception of the valve plug 15, the walls of said hole 14 acting as a valve seat.

The valve plug has a hole 16 through it in the region of the passageway 13 and said valve plug is held in place under tension by a spring 17 surrounding the reduced end 18 of the valve plug and engaging the valve body, as the stationary element, and a nut 19, or equivalent, as the movable element.

The upper or outer end of the valve plug is cut away so as to form one element 20 of a clutch which is in fact an offset shoulder and this is designed to co-operate with the coacting clutch element 21 which like the element 20 is an offset shoulder formed at the lower end of the post 22, the latter being formed as an integral part of the handle 23 by die-casting or any other method of manufacture or said post may be brased, welded or otherwise similarly secured to the handle so that in the finished product, said post and handle are integral.

Figure 5:
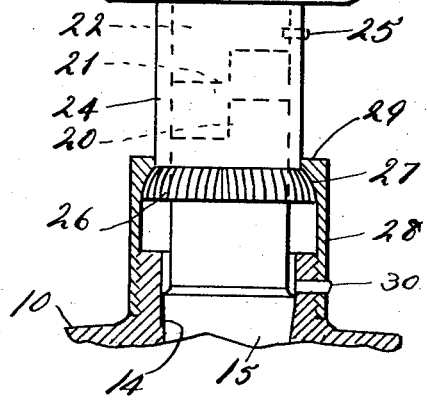
Fig. 5 is an enlarged fragmentary sectional view somewhat similar to Fig. 4, with the valve plug and sleeve and their component parts left in elevation.

One end of a sleeve 24 is passed over the post 22 so that said post projects part way into the upper or outer end of said sleeve and the two are then fastened together in some suitable manner as by a pin 25 and the lower end of said sleeve carries a clutch element 26 in the form of a serrated collar best illustrated in Fig. 5 and the serrations are tapered so that the collar is in reality frusto-conical but this taper may be of any desirable pitch although as herein shown, it is somewhat exaggerated, beyond what I believe to be necessary for proper operation.

The clutch element 26 is adapted to interengage with a similar clutch element 27 formed on the inside of the upper or outer end of the barrel 28 which also has an inwardly projecting flange 29 at its upper or outer end to snugly fit the sleeve 24 permitting said sleeve to either slide or rotate, but excluding dust, dirt and other foreign matter which might enter the serrations of the clutch elements if no protecting flange was provided. The barrel 28 in the complete assembly forms a part of the valve body and therefore is mounted on said valve body in any suitable manner, the same being shown for convenience of illustration as having threaded connection with the valve body proper and then fixed in place by a pin 30 or its equivalent.

In order to normally hold the clutch elements 26 and 27 in engagement with each other and to normally hold the clutch elements 20 and 21 out of engagement, I provide a spring 31 between the valve plug, and more particularly that part which might be termed the stem thereof, and the post 22 which will normally force said post outward away from the valve plug and carry the sleeve 24 with it and as will be obvious the ends of the springs may be socketed in the respective parts with which they co-operate.

In addition to the barrel 28 having means in the form of the flange 29 to protect the clutch elements 26 and 27 against the clogging action of foreign matter, the sleeve 24 which carries the clutch element 26 is so connected with the handle that the latter is free from cavities, crevises or holes in the exterior surface and no element protrudes through said handle when the latter is depressed for temporarily connecting the handle with the valve plug.

Figure 4:
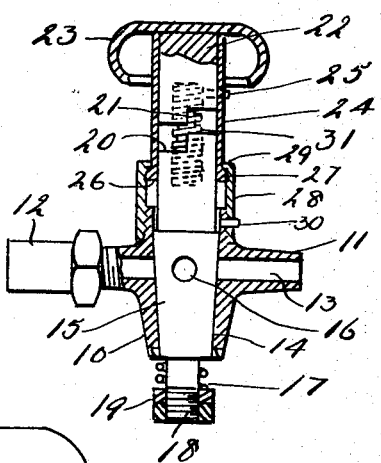
Fig. 4 is a section on the line 4—4 of Fig. 2 with the outlet left in elevation.

When the parts are in the normal locked position as shown in Figs. 4 and 5, the clutch element 21 is out of engagement with the clutch element 20, and therefore it is impossible to transmit any motion from the handle to the valve plug and at the same time the clutch element 26 is in engagement with the clutch element 27 so that the handle cannot be rotated and therefore the aligned positions of the clutch elements 20 and 21 are always maintained regardless of the positions of the parts.

Of course I do not wish to be limited to the exact details of construction as herein shown, as these may be varied within the limits of the appended claims without departing from the spirit of my invention.

Having thus fully described my invention, what I claim as new and useful is:—

1. A locking valve for gas burners including a body, a barrel mounted on said body, a clutch element carried thereby, an inwardly projecting flange beyond said clutch element, a valve plug rotatably mounted in the body and having a clutch element at its outer end, a handle, a post carried by said handle, a clutch element at the inner end of said handle for co-operation with the clutch element on the valve plug, a sleeve secured to said post with its inner end projecting into the barrel, a clutch element carried by the inner end of said sleeve for co-operation with the clutch element on the barrel, and means to normally force the post and component parts outward to hold the valve plug and post clutch elements out of engagement and to hold the sleeve and barrel clutch element in engagement.

2. The structure set forth in claim 1 wherein the sleeve and barrel clutch elements are in the form of beveled serrations.

3. A locking valve for gas burners comprising a valve body, a valve plug rotatably mounted therein, said valve plug having a clutch element at its outer end, a handle, an integral post on said handle, a clutch element formed on the inner end of said post for co-operation with the clutch element on the outer end of the valve plug, a sleeve projected over said post and fixed thereon with the inner lower end of said sleeve projecting beyond the post and slidable on the valve plug, a clutch element on the outside of said inner lower end of the sleeve, a barrel surrounding the inner end of the sleeve and mounted upon said fixed to the valve body, an inwardly projecting flange formed with the outer end of the barrel and snugly fitting the sleeve to exclude foreign matter, a clutch element formed on the inside of said barrel adjacent its outer end for co-operation with the clutch on the sleeve, and means between the valve plug and post to normally move said post and component parts outward for the purpose set forth.

4. A locking valve for gas burners consisting of a body, a valve plug therein, a handle mechanism rotatably and slidably mounted relative to the body, a clutch element on the end of the valve plug adjacent the handle mechanism, another clutch element on the valve body and consisting of a multiplicity of serrations arranged in a circle about a portion of the handle mechanism, two other clutch elements both upon the handle mechanism one of which consists of a multiplicity of serrations arranged in a circle for interengagement with the similar clutch element on the valve body, the clutch elements on the handle mechanism being properly spaced apart whereby they may be alternately engaged with their respective co-operating clutch elements and the movements of said clutches overlapping so that one is placed in an operative condition prior to the other assuming an inoperative position and the clutch produced by the serrated clutch elements permitting the valve plug to be adjusted substantially to any angular position and the handle mechanism then held inoperative but always in the same relative position to the valve plug, and means to normally force the handle mechanism outward and maintain the serrated clutch elements in engagement while permitting said handle mechanism to be manually actuated for disengaging the serrated clutch elements and temporarily engaging the other clutch elements.

5. A safety valve for gas burners comprising a body, a housing carried by said body, stop shoulders within said housing, a clutch element at the outer end of said housing, a valve plug rotatably mounted within the body and extending through the housing, a stop pin carried by the plug for coaction with the shoulders to limit the rotation of said plug, a clutch element at the outer end of the valve plug, a post projecting from the outer end of the valve plug, a sleeve surrounding the upper end of the valve plug and provided with a clutch element at its inner end for coaction with the clutch element on the valve housing, a barrel within the sleeve provided with a clutch element for coaction with the valve plug clutch element, one pair of clutch elements being in engagement when the other pair are out of engagement, a hand hold connected with the sleeve and barrel but all slidably mounted upon the post, and means to normally force said handle outward.

In testimony whereof, I have hereunto affixed my signature.

CHARLES E. WISE.